(12) United States Patent
Segen, Jr.

(10) Patent No.: US 6,250,909 B1
(45) Date of Patent: Jun. 26, 2001

(54) WEB CLAMP FOR THERMOFORMING PROCESSES

(75) Inventor: Edward D. Segen, Jr., Wilton, CT (US)

(73) Assignee: Edward D. Segan & Co., Inc., Shelton, CT (US)

( * ) Notice: Subject to any disclaimer, the term of this patent is extended or adjusted under 35 U.S.C. 154(b) by 0 days.

(21) Appl. No.: 09/304,335

(22) Filed: May 3, 1999

(51) Int. Cl.$^7$ .................................................. B29C 51/26
(52) U.S. Cl. .................................... 425/400; 425/DIG. 48
(58) Field of Search .................................. 425/397, 400, 425/DIG. 48

(56) References Cited

U.S. PATENT DOCUMENTS

| 4,009,981 | * | 3/1977 | Rosen | 425/388 |
| 4,099,901 | * | 7/1978 | Shuman | 425/388 |
| 4,360,491 | * | 11/1982 | Holden, Jr. | 264/294 |
| 4,938,678 | * | 7/1990 | Oulman | 425/397 |
| 6,098,510 | * | 8/2000 | Hada et al. | 83/13 |

* cited by examiner

Primary Examiner—Harold Pyon
Assistant Examiner—Donald Heckenberg
(74) Attorney, Agent, or Firm—John H. Crozier

(57) ABSTRACT

In a preferred embodiment, a web clamp arrangement for thermoforming processes, the web clamp arrangement including: first and second web clamp assemblies to be disposed, respectively, at front and rear ends of a mold base to clamp a web of thermoforming material against a pressure box disposed above the mold base; each of the first and second web clamp assemblies including a normally horizontal clamp bar attached to two vertical rods, which rods force the clamp bar against a lower surface of the web to force the web against an edge of the pressure box; and the normally horizontal clamp bar being movably attached to distal ends of the vertical rods, such that vertical misalignment of the clamp bar during clamping of the web against the edge of the pressure box is accommodated by relative movement of the normally horizontal clamp bar and the distal ends of the vertical rods such as to prevent damage to the first and second web clamp assemblies.

5 Claims, 9 Drawing Sheets

WEB CLAMP FOR THERMOFORMING PROCESSES

BACKGROUND OF THE INVENTION

1. Field of the Invention

The present invention relates to thermoforming generally and, more particularly, but not by way of limitation, to a novel web clamp for use in thermoforming processes.

2. Background Art

Thermoforming is widely used for producing three dimensional objects from relatively thin sheets of thermoplastic materials, such objects often being used a containers or parts of containers for goods, and are typified by blister pack covers, pastry domes, and fast-food sandwich containers, to name only a few examples.

In a typical thermoforming process, a rectangular mold base is provided which may have one or more cavities defined therein or may have provision made for affixing thereto one or more mold cavities. A web of thermoplastic material is fed from a roll of such material, heated and then indexed over the mold cavities. A plurality of holes defined through the walls of the cavities is connected to a vacuum source to draw the thermoplastic material into the cavities. To assist this drawing operation, pressure is applied to the upper surface of the thermoplastic material. Such pressure is supplied from a rectangular pressure box which is temporarily placed over the mold base and removably sealed thereto, the pressure box having an open base and a top with four walls depending therefrom. After forming, coolant may be supplied to the mold base and the molded objects are removed from the mold base typically by means of a stripper plate built into the mold base.

Movement of the web is achieved by means of pin chains disposed at either side of the web, with pins inserted into edges of the web, and with the chains moving along a defined path. When the pressure box is sealed to the mold base, the pin chains secure the web against sidewise movement during the molding operation. To secure the web against lengthwise movement in the index direction, clamps are provided at either end of the mold base, with a clamp bar of each clamp assembly firmly clamping the web to the front and rear edges of the pressure box as the pressure box and the mold base engage each other. Each clamp bar is conventionally moved by vertical shafts rising from two vertical air cylinders to press the web against grooves formed in the edges of the pressure box. A disadvantage of such conventional web clamps is that the vertical shafts are rigidly attached to the clamp bar and are unable to accommodate any mechanical misalignments or distortion of the web. As a result, the vertical shafts are subject to damage. A further disadvantage of the conventional arrangement is that the air cylinders used have relatively large diameters. This requires that the mold be disposed farther from the heater than is otherwise desirable, in order to accommodate the diameter of the air cylinders.

Accordingly, it is a principal object of the present invention to provide a web clamp for thermoforming operations that can accommodate mechanical misalignments or distortion of the web.

It is a further object of the invention to provide such a web clamp that is economically constructed.

It is an additional object of the invention to provide such a web clamp that reduces the required spacing of thermoforming mold and heater.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a web clamp arrangement for thermoforming processes, the web clamp arrangement comprising: first and second web clamp assemblies to be disposed, respectively, at front and rear ends of a mold base to clamp a web of thermoforming material against a pressure box disposed above said mold base; each of said first and second web clamp assemblies including a normally horizontal clamp bar attached to two vertical rods, which rods force said clamp bar against a lower surface of said web to force said web against an edge of said pressure box; and said normally horizontal clamp bar being movably attached to distal ends of said vertical rods, such that vertical misalignment of said clamp bar during clamping of said web against said edge of said pressure box is accommodated by relative movement of said normally horizontal clamp bar and said distal ends of said vertical rods such as to prevent damage to said first and second web clamp assemblies.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1A:
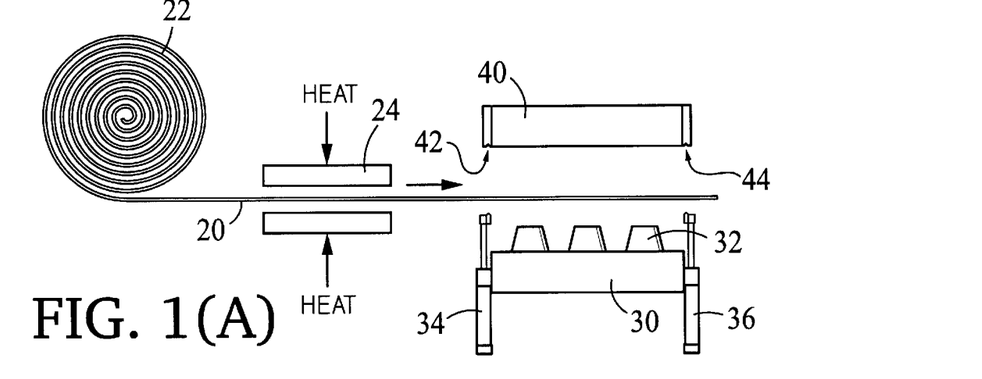
FIGS. 1A–1C are schematic views of a typical thermoforming operation employing web clamps according to the present invention.
Figure 1B:
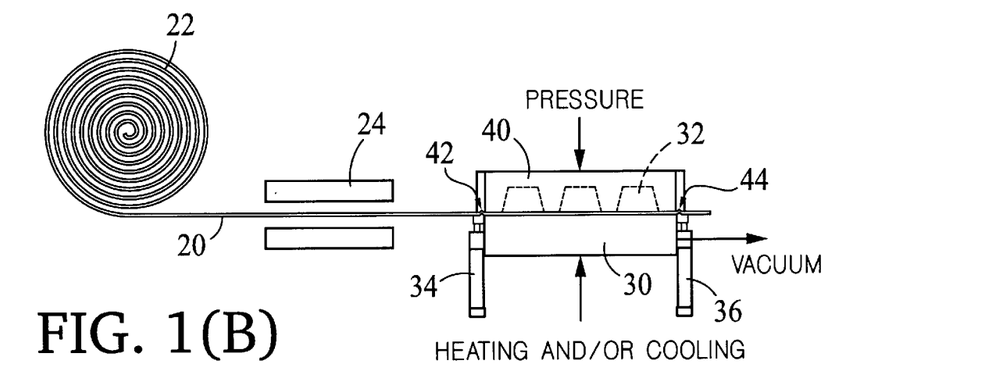
Figure 1C:
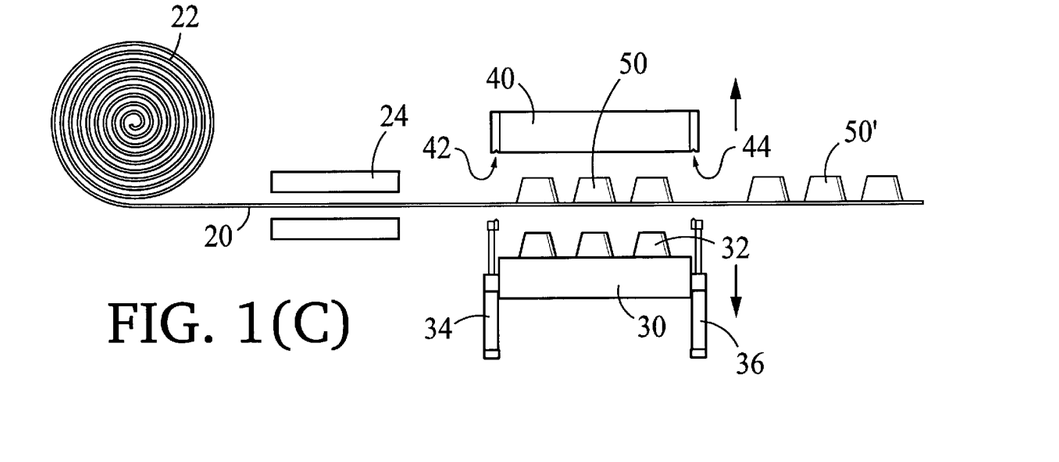

Referring first to FIGS. 1A–1C, there is illustrated a typical termoforming operation in which the clamp bars of the present invention may be employed. As seen on FIG. 1A, a web 20 of unformed thermoplastic material is fed from a roll 22 of such material through a heater 24 where the web is softened. Web 20 is then indexed over a mold base 30 having rising therefrom a plurality of male molds, as at 32, and having attached to the front and rear edges thereof, respectively, first and second web clamp assemblies 34 and 36. Web 20 is moved by means of conventional pin chains (not shown) disposed at either side of the web and engaging the web. A pressure box 40 having, respectively, first and second grooves 42 and 44 defined in lower edges of the front and rear ends of the pressure box, is positioned over mold base 30. Grooves 42 and 44 may be, for example, V-shaped, square-shaped, or have another desired shape.

Then, as is indicated on FIG. 1B, pressure box 40 is lowered until the bottom edge thereof comes down to the sheet line of web 20. Then, mold base 30 rises, moving molds 32 into pressure box 40 and engaging web 20. As mold base 30 is rising, the upper edges of first and second web clamping assemblies 34 and 36 grip web 20 by forcing it into first and second grooves 42 and 44. Thus, as noted above, web 20 is securely held by the pin chains (not shown) at the sides of the web and by clamping assemblies 34 and 36 at the front and the rear of pressure box 40, so that there is no distorting of web 20 outside the forming area of the web during the time the pressure box and mold base 30 are coming together. Next, a source of vacuum is supplied to mold base 30, air pressure is applied to pressure box 40, and heating or cooling may be supplied to the mold base to maintain a predetermined temperature in the mold base. This operation draws web 20 around male molds 32. Then, as seen on FIG. 1C, pressure box 40 and mold base 30 are separated and web 20, with molded objects, as at 50, formed therein and conforming to the shape of molds 32 is moved to a station (not shown) where the molded objects are cut from the web. Previously molded objects, as at 50', are shown as having been moved from pressure box 34 and mold base 30.

Figures 2A, 2B:
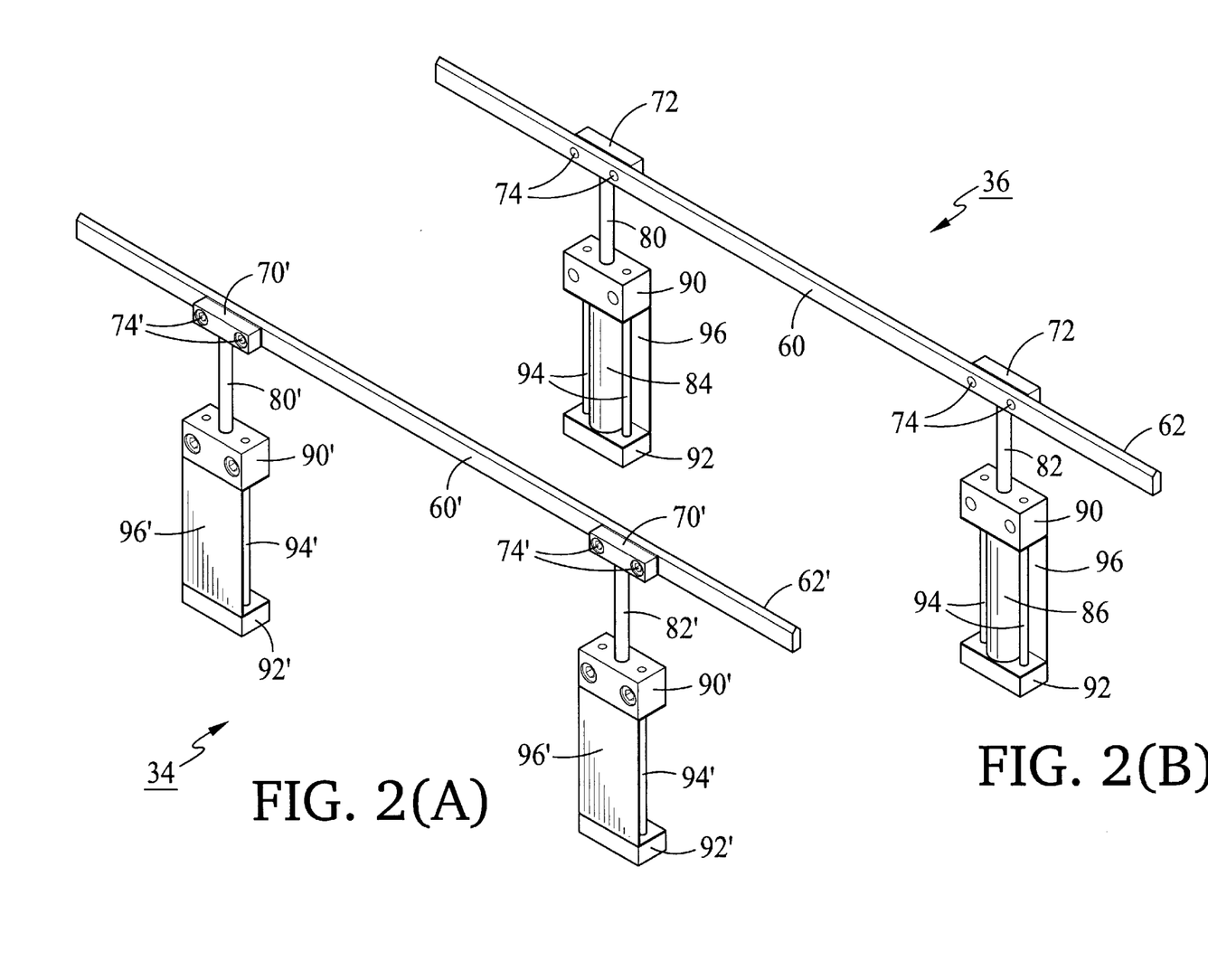
FIGS. 2(A) and 2(B) are isometric views showing the web clamps.

FIGS. 2(A) and 2(B) illustrate the major elements of first and second web clamp assemblies 34 and 36. The elements of second web clamp assembly 36 will be described and assigned reference numerals, while the corresponding elements of first web clamp assembly 34 will be given primed reference numerals, it being understood that the elements of first web clamp assembly have the same structure and function as the corresponding elements of the second web clamping assembly.

An elongated horizontal clamp bar 60 extends along and defines the length of second web clamp assembly 36 and has an inverted V-shaped top surface 62' to engage web 20 (FIG. 1) and force it into groove 44 on pressure box 40. Clamp bar 60 is held in position by first and second clamp bar retainers 70 and 72 attached to the clamp bar by means of threaded fasteners 74. Also attached, respectively, to first and second clamp bar retainers 70 and 72 are vertical cylinder rods 80 and 82 rising, respectively, from vertical gas spring cylinders 84 and 86 (shown only on web clamp assembly 36). Each gas spring cylinder 84 and 86 is captured between upper and lower cylinder retainers 90 and 92 and is held therein by means of two threaded tie rods 94 which secure together the upper and lower cylinder retainers. Vertical heat shield plates 96 extend between upper and lower cylinder retainers 90 and 92.

Figure 3:
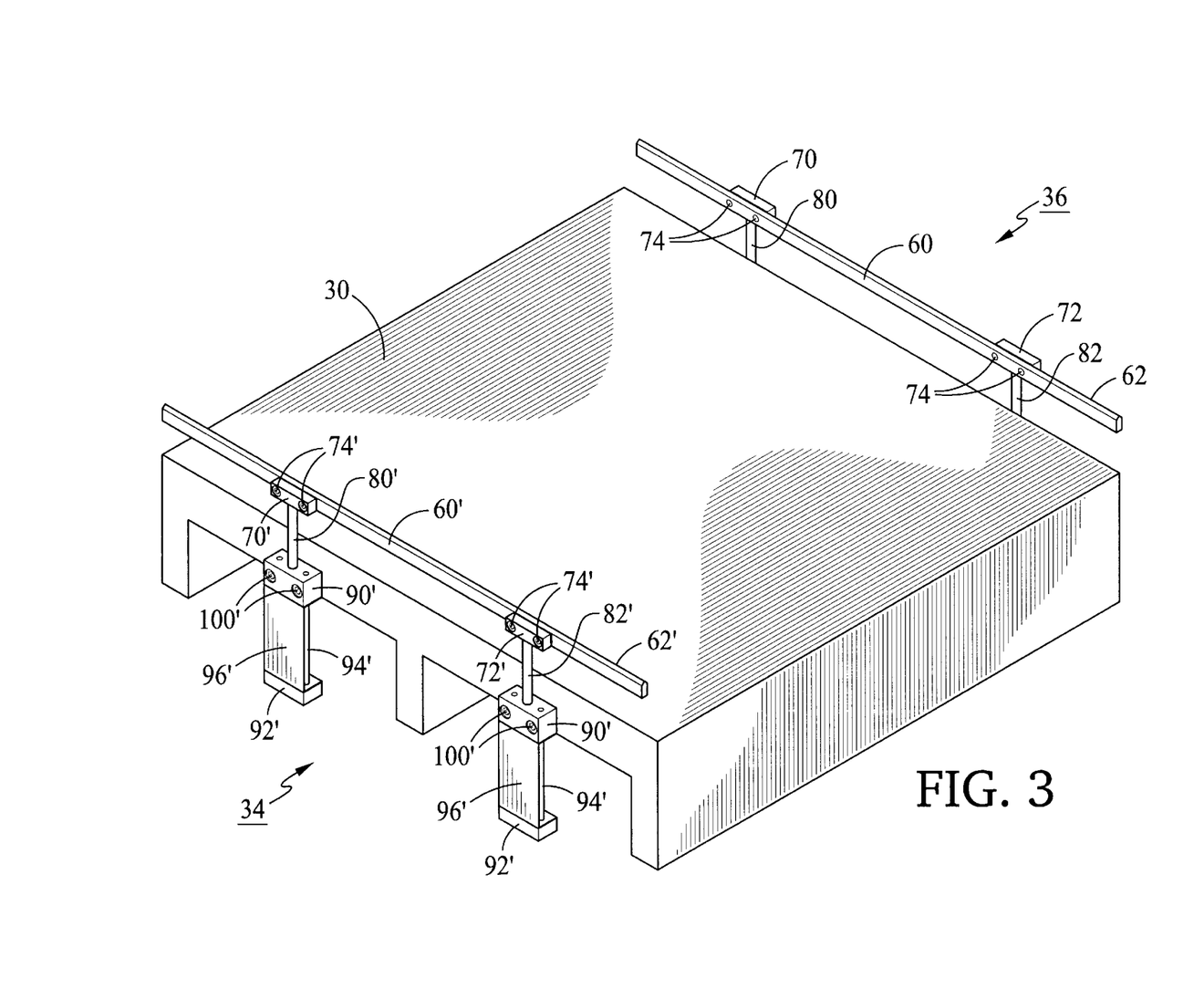
FIG. 3 is an isometric view showing the web clamps attached to a mold base

FIG. 3 illustrates first and second web clamp assemblies 34 and 36 attached to mold base 30, the attachment means (visible only for the first web clamp assembly) consisting of a plurality of threaded fasteners 100 inserted through upper retainer 90 into the mold base. It will be understood that mold base 30 would conventionally be provided with mold forms or cavities (none shown).

Figure 4A:
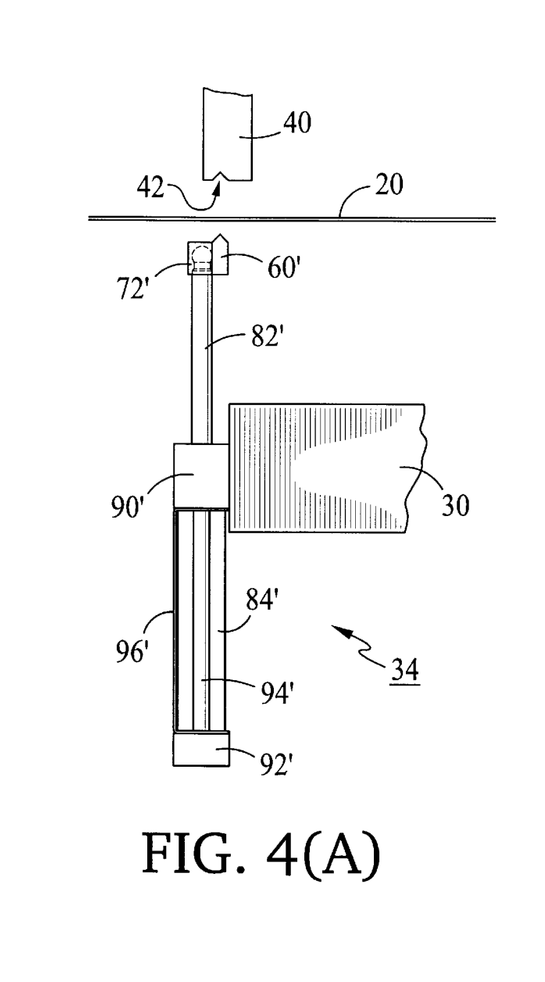
FIGS. 4(A)–4(C) are fragmentary, side elevational views showing the operation of a web clamp in clamping a portion of a web.
Figure 4B:
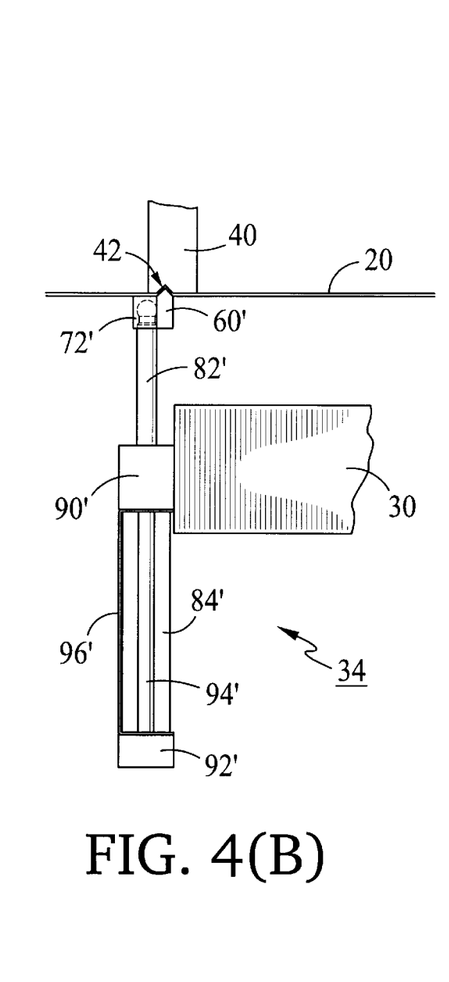
Figure 4C:
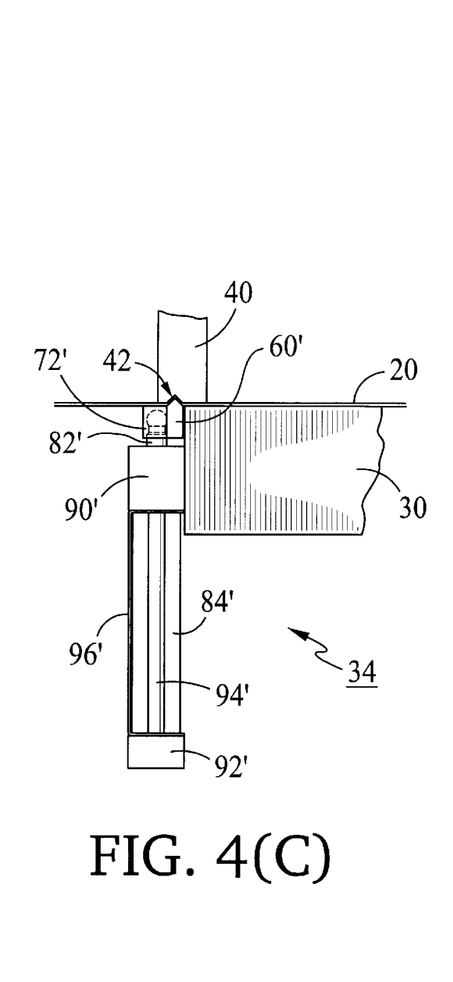

FIGS. 4(A)–4(C) illustrate the functioning of the present invention in clamping off web 20. Referring first to FIG. 4(A), in the initial position of the elements of the thermoforming process (FIGS. 1(A)–1(C)), web 20, pressure box 40 and clamp bar 60' are all spaced part. It will be understood that web 20 and pressure box 40 will be similarly spaced apart from clamp bars 60 and 60'. As pressure box 40 and mold base 30 approach each other, as shown on FIG. 4(B), clamp bar 60' engages web 20, forcing the web into groove 42, and cylinder rod 82' begins to be forced into gas spring cylinder 84', causing the gas in the gas spring cylinder to be compressed and providing a concomitant increase in the force clamping the web to the pressure box. FIG. 4(C) shows mold base 30 and pressure box fully engaged.

Figure 5A:
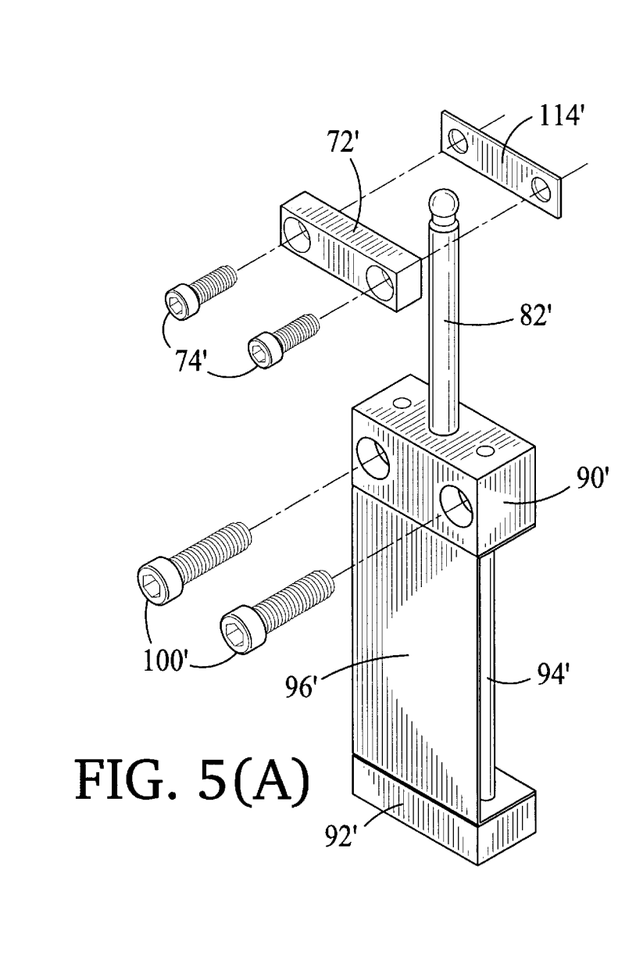
FIGS. 5(A) and 5(B) are fragmentary, exploded isometric views showing the construction of the web clamps.
Figure 5B:
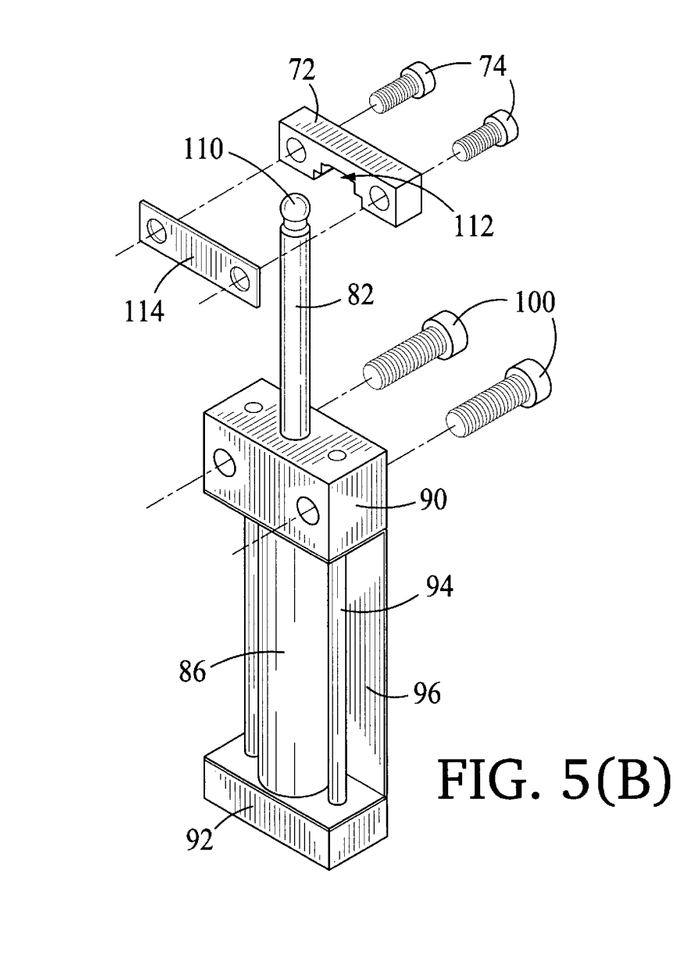

FIGS. 5(A) and 5(B) illustrates the details of construction of portions of first and second clamp bar assemblies 34 and 36 (FIGS. 2(A) and 2(B)). Again, the description is made with reference to second clamp bar assembly 36. In addition to the elements previously described above, the distal end of cylinder rod 82 terminates in a ball 110 which is captured in a cavity 112 (visible only on FIG. 5(B)) defined in second clamp bar retainer 72 by means of a vertical wear plate 114 covering the open side of the cavity.

Figure 6:
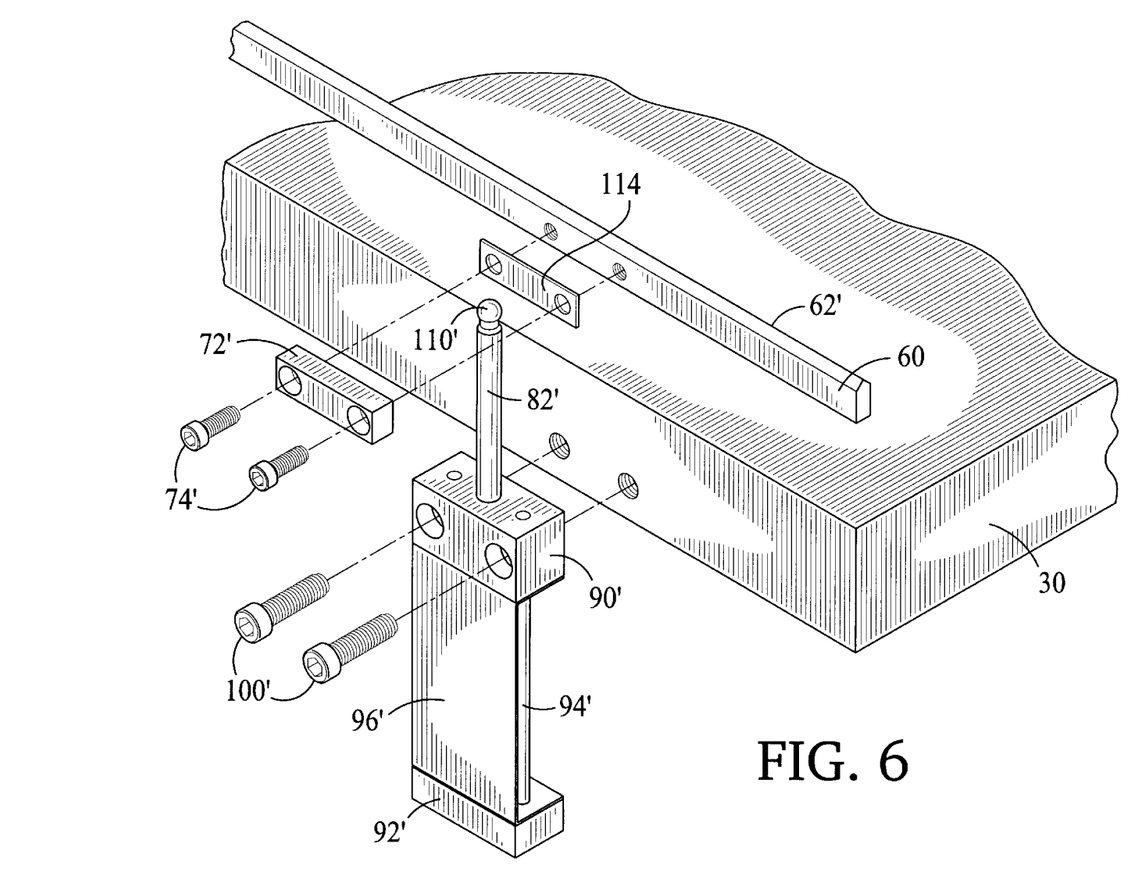
FIG. 6 is an exploded isometric view showing the construction of the web clamp and its attachment to a mold base.

FIG. 6 illustrates that wear plate 114' is disposed between second clamp bar retainer 72' and clamp bar 60'.

Figure 7:
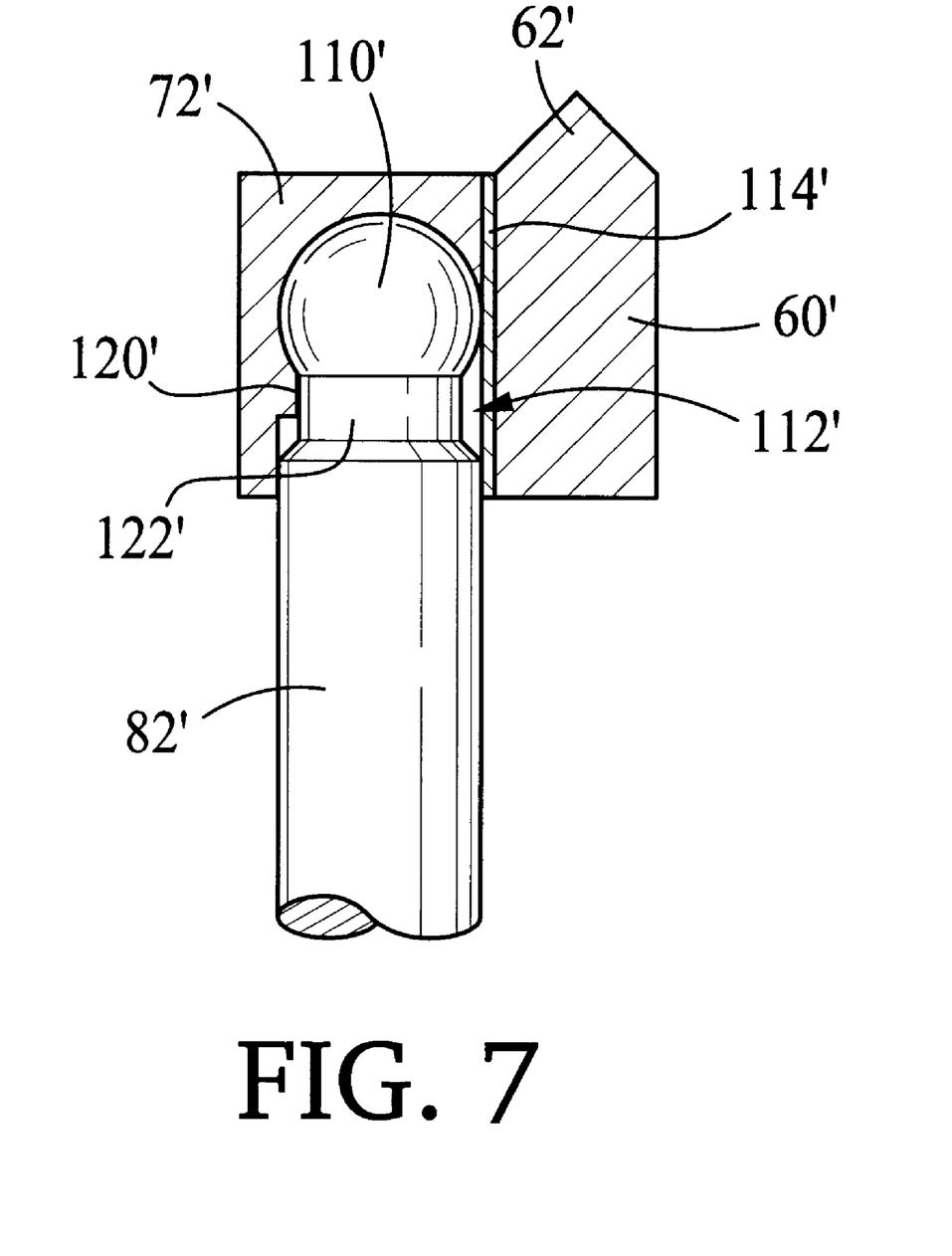
FIG. 7 is a side elevational view, partially in cross-section, showing how the end of a cylinder rod is captured in a clamp bar retainer.

FIG. 7 illustrates the details of the capturing of ball 110' in clamp bar retainer 72'. Here, in addition to wear plate 114' which secures ball 110' against horizontal movement out of cavity 112', there is provided along the wall of the cavity opposite the wear plate a horizontal flange 120' which engages a neck portion 122' of cylinder rod 82' formed on the cylinder rod immediately below the ball, thus securing the ball against vertical movement relative to second clamp bar retainer 72'.

Figure 8:
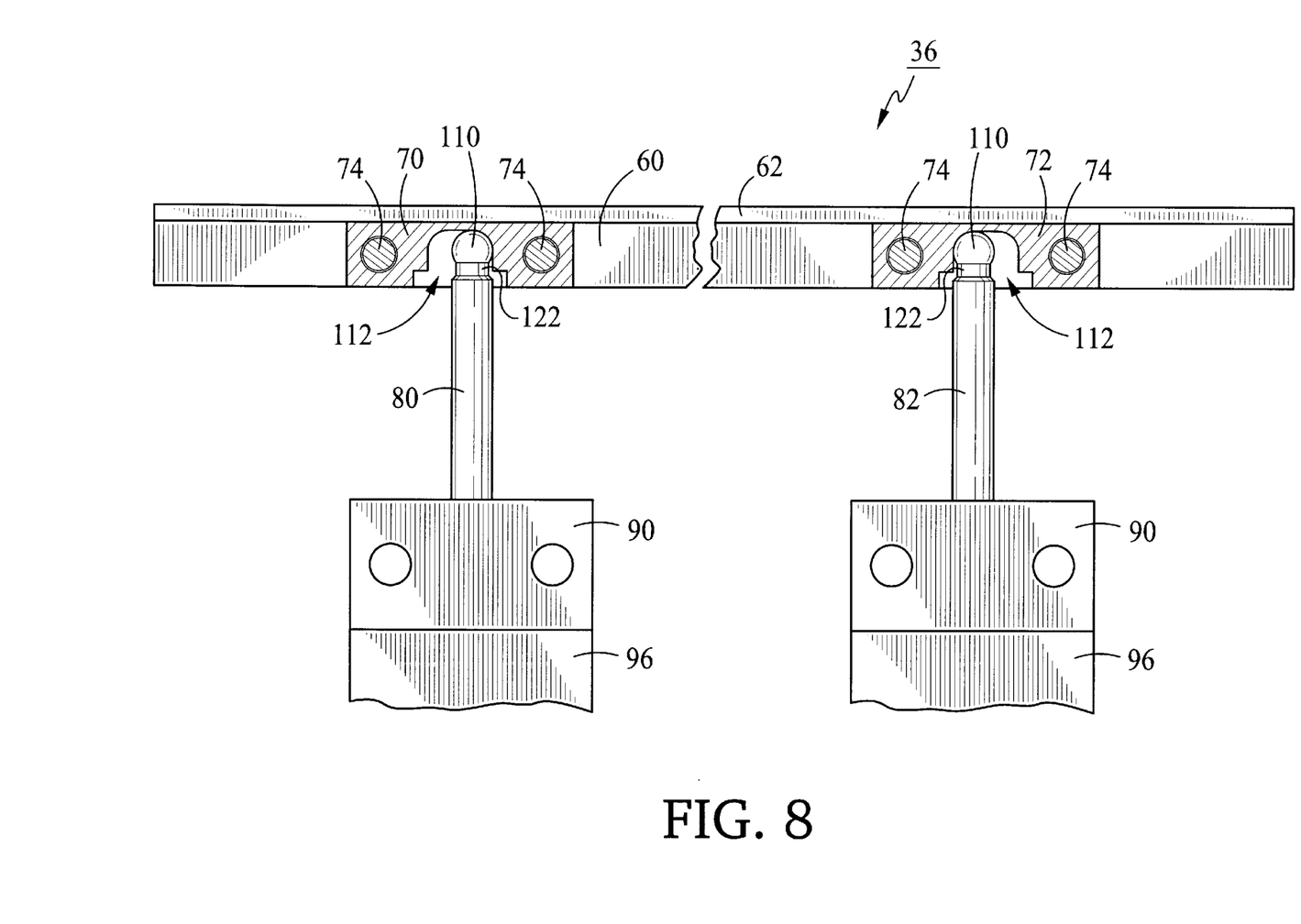
FIG. 8 is a fragmentary, end elevational view, partially in cross-section, of a clamp bar assembly showing how a clamp bar is prevented normally from moving horizontally.

FIG. 8 illustrates second clamp bar assembly 36 in its normal horizontal position. It can be seen that the centerlines of first and second clamp bar retainers 70 and 72 are horizontally offset, respectively, from the centerlines of first and second cylinder rods 80 and 82, such that balls 110 contact the inner surfaces of cavities 112, thus preventing clamp bar 60 from moving horizontally with respect to mold base 30 (FIG. 3) to which clamp bar assembly 36 is attached.

Figure 9:
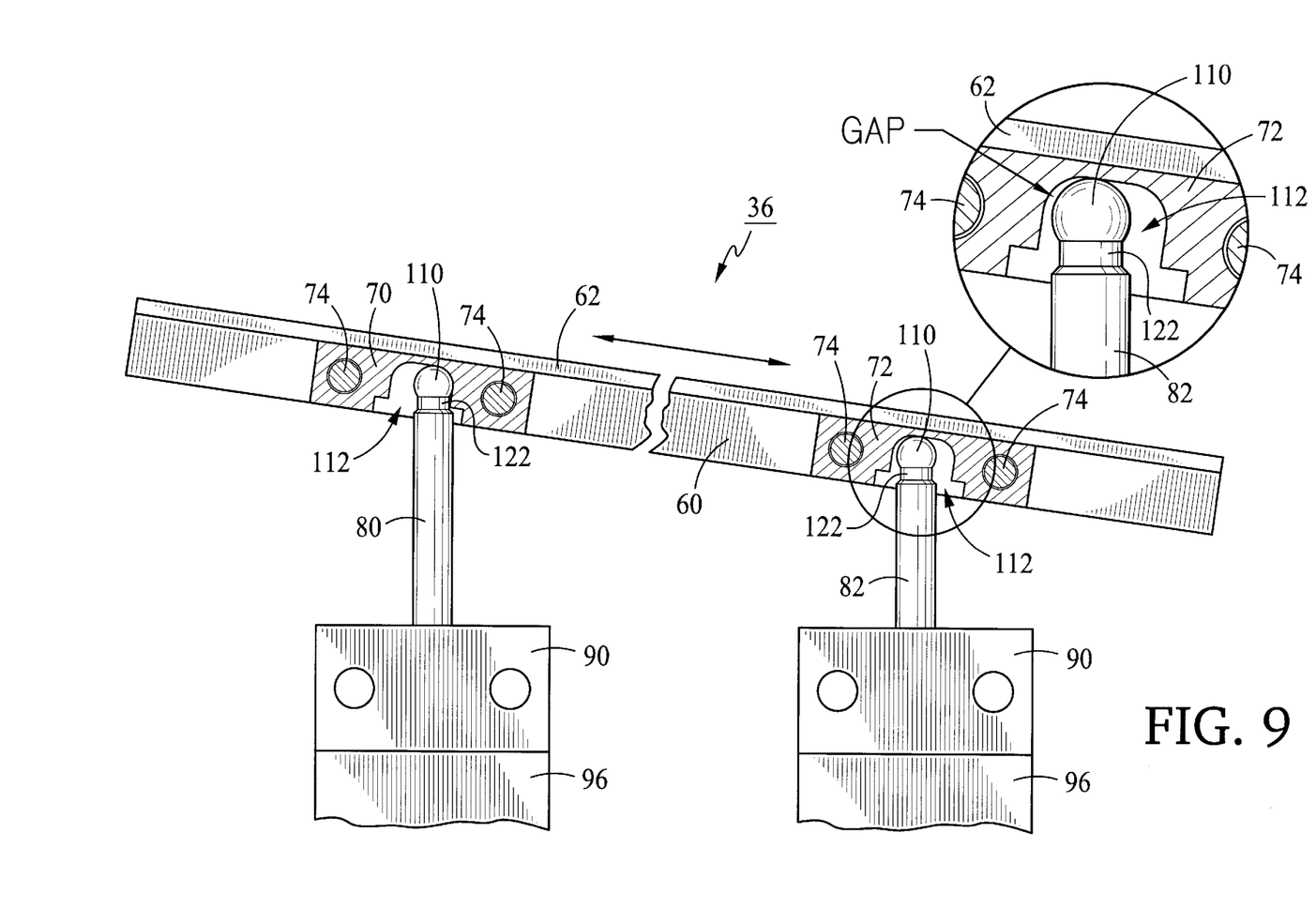
FIG. 9 is a fragmentary, end elevational view, partially in cross-section, of a clamp bar assembly showing how a clamp bar assembly accommodates misalignment of a thermoforming web.

FIG. 9 illustrates second web clamping assembly 36 in a (somewhat exaggerated) non-horizontal position which might come about because of a double shot or a missed index. In this case, the angular distance between ball ends 110 increases, and, as shown on FIG. 9, ball end 110 slides outwardly in second clamp bar retainer 72 to compensate for the increase in angular distance. Of course, depending on the off balance forces, compensation may also be achieved by ball end 110 sliding outwardly in first clamp bar retainer 70, or the compensation may be shared by the two clamp bar retainers, as indicated by the double-headed arrow on FIG. 9. In any case, misalignment is compensated for, thus reducing or eliminating the possibility of damage to second web clamping assembly 36.

Gas spring cylinders 84 and 86 are part of commercially available gas springs each of which includes a sealed, compressed-gas-containing cylinder. Typcially, the gas employed is nitrogen. When a cylinder rod extending from the cylinder is forced downwardly into the cylinder, the gas within the cylinder is compressed further, thus providing a force in opposition to the force causing the compression.

A particular advantage of the use of the gas springs is that the diameter of the cylinders is substantially less than the compressed air cylinders conventionally employed. This translates to being able to desirably position the molding equipment closer to the heater (FIG. 1).

The present invention is inexpensive to manufacture and easily installed on new or existing thermoforming tooling. The self-contained gas activated springs eliminate the need to hook up compressed gas, as is the case with the conventional gas cylinders used in thermoforming processes. These features result in savings in tool building costs and thermoformer set up time. Maintenance is likewise simple and inexpensive.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A web clamp arrangement for thermoforming processes, the web clamp arrangement comprising:
   (a) first and second web clamp assemblies to be disposed, respectively, at front and rear ends of a mold base to clamp a web of thermoforming material against a pressure box disposed above said mold base;
   (b) each of said first and second web clamp assemblies including a normally horizontal clamp bar attached to two vertical rods, which rods force said clamp bar against a lower surface of said web to force said web against an edge of said pressure box; and
   (c) said normally horizontal clamp bar being (moveably) rotatable and horizontally moveably attached to distal ends of said vertical rods, such that vertical misalignment of said clamp bar during clamping of said web against said edge of said pressure box is accommodated by relative movement of said normally horizontal clamp bar and said distal ends of said vertical rods such as to prevent damage to said first and second web clamp assemblies.

2. A web clamp, as defined in claim 1, wherein:
   (a) said distal ends of said vertical rods are ball-shaped;
   (b) said distal ends of said vertical rods being captured in openings defined in clamp bar retainers fixedly attached to said normally horizontal clamp bar; and
   (c) said ball-shaped ends of said vertical rods are secured in said openings by vertical wear plates covering an open side of said openings and by horizontal flanges formed in said openings engaging necks defined in said vertical rods below said ball-shaped ends.

3. A web clamp, as defined in claim 1, wherein: said vertical rods are piston rods of gas spring cylinders.

4. A web clamp, as defined in claim 3, wherein: said gas spring cylinders are fixedly attached to ends of said mold base.

5. A web clamp arrangement for thermoforming processes, the web clamp arrangement comprising:
   (a) first and second web clamp assemblies to be disposed, respectively, at front and rear ends of a mold base to clamp a web of thermoforming material against a pressure box disposed above said mold base;
   (b) each of said first and second web clamp assemblies including a normally horizontal clamp bar attached to two vertical rods, which rods force said clamp bar against a lower surface of said web to force said web against an edge of said pressure box;
   (c) said two vertical rods being piston rods of gas spring cylinders;
   (d) distal ends of said vertical rods are ball-shaped;
   (e) said distal ends of said vertical rods are captured in openings defined in clamp bar retainers fixedly attached to said normally horizontal clamp bar; and
   (f) said ball-shaped ends of said vertical rods are secured in said openings by vertical wear plates covering an open side of said openings and by horizontal flanges formed in said openings engaging necks defined in said vertical rods below said ball-shaped ends.

* * * * *